United States Patent Office 3,412,132
Patented Nov. 19, 1968

3,412,132
2-BRANCHED ALKYL-4,6-DINITROPHENYL ALKYL CARBONATES
Max Pianka, St. Albans, and John Duncan Edwards, Luton, England, assignors to The Murphy Chemical Company Limited, St. Albans, England, a British company
No Drawing. Filed Aug. 2, 1965, Ser. No. 476,754
Claims priority, application Great Britain, Aug. 7, 1964, 32,306/64
7 Claims. (Cl. 260—463)

ABSTRACT OF THE DISCLOSURE

There are provided compounds of the formula

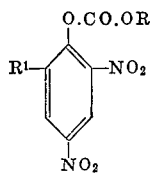

in which R is an alkyl group which may be branched, containing from 1 to 6 carbon atoms and in which $R^1$ represents 1-ethyl-n-hexyl or 1-n-propyl-n-pentyl. The compounds of the invention are of low phytotoxicity and have good acaricidal and in some instances also particular fungicidal properties.

---

This invention is concerned with improvements in or relating to pesticides.

In United States application No. 180,013, filed Mar. 15, 1962, which matured to Patent No. 3,234,260, there are described and claimed novel pesticides of the general formula

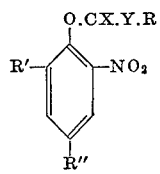

in which X and Y are the same or different and each is an oxygen or sulphur atom, R is inter alia an alkyl group, and one of R′ and R″ is a nitro group and the other, is a branched aliphatic hydrocarbon group having 4 to 8 carbon atoms, a phenyl, substituted phenyl, cyclohexyl or substituted cyclohexyl group.

It has now been found that certain 2-octyl-4,6-dinitrophenyl alkyl carbonates, which fall within the general Formula I but are not specifically disclosed in said application, have good acaricidal and in some instances also particular fungicidal properties. In particular, the carbonates of the present invention have, both a mildewicidal activity against cucumber mildew and acaricidal activity, which is higher than that of the specific compounds disclosed in said application. Further, the compounds of the present invention show acaricidal activity against mites which are resistant to organo-phosphorus compounds.

A further advantage of the compounds of the present invention is that they have low phytotoxicity and in particular they are in general less phytotoxic than the corresponding parent dinitroalkylphenols.

According to the present invention therefore there are provided compounds of the general formula:

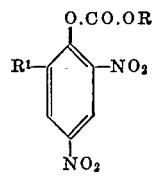

in which R is an alkyl group which may be branched, containing from 1 to 6 carbon atoms and in which $R^1$ represents 1-ethyl-n-hexyl or 1-n-propyl-n-pentyl.

The group R may contain from 1 to 4 carbon atoms only. It may thus be methyl, ethyl, propyl, isopropyl, butyl or isobutyl. Particularly preferred compounds are however those where R is methyl or ethyl. The methyl carbonate esters have excellent activity and the ethyl carbonate esters also have a high level of activity.

Various methods have been proposed for the preparation of dinitro derivatives of hydrocarbon-substituted phenols but in many cases the products were mixtures of isomers. These mixtures included both position isomers and also isomers of the hydrocarbon side chain. Therefore, whichever method is adopted to prepare the alkyl phenols and their dinitro derivatives which are used to prepare the carbonates of the present invention, care should be taken to ensure that the desired compound is obtained.

The compounds of the present invention may be prepared by reacting a compound of the general formula:

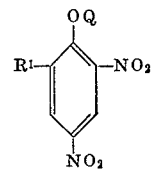

in which Q represents a hydrogen or an alkali metal atom, preferably sodium or potassium, and $R^1$ has the above defined meaning, with a haloformic acid ester of the formula:

$$Z.CO.OR \qquad (IV)$$

where Z is chlorine, bromine or iodine, preferably chlorine, and R has the above defined meaning, the reaction being effected in the presence of an acid binding agent, e.g. an alkali metal carbonate, an alkali metal bicarbonate or a tertiary amine (e.g. pyridine), where Q represents a hydrogen atom. In practice the reaction is conveniently effected in solution in an inert organic solvent, e.g. a ketone such as acetone.

The phenoxide of Formula III (where Q is an alkali metal) may be preformed, or, preferably may be formed in situ in an inert organic solvent prior to introduction of the haloformic acid ester by reaction of the parent phenol (V) with a suitable alkali metal compound, e.g. the hydroxide, carbonate or bicarbonate.

The preparation of the compounds according to the invention by the reaction of the phenoxide of general Formula III with a compound of general Formula IV is particularly advantageous since the use of the phenoxide in place of the parent phenol (V) and a tertiary base leads, in general, to a more economic process.

However, another advantageous method of preparing the compounds according to the invention comprises the simultaneous reaction of the parent phenol (V) with a haloformic acid ester (IV) in an inert organic solvent (e.g. a ketone such as acetone) in the presence of an alkali metal carbonate or alkali metal bicarbonate, preferably an alkali metal carbonate. This process also in general gives a more economic process as compared with the use of the parent phenol (V) and a tertiary base. The use of alkali metal carbonates or alkali metal bicarbonates is preferred.

The haloformic acid esters (IV) may conveniently be prepared by reaction of a compound of the formula ROH with a compound of the formula $COZ_2$ according to the equation:

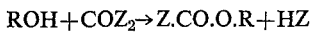

Thus, the chloroformic acid esters may be produced by the following reaction:

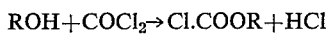

In general, this reaction may be carried out in the presence of aluminium chloride as catalyst and where required in the presence of an acid binding agent.

The parent dinitro-alkyl phenols:

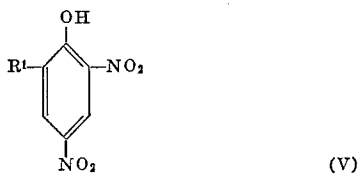

where $R^1$ has the meaning given above, may be prepared by dinitration of the corresponding alkylphenols. This dinitration may be carried out by any convenient method. However, a preferred method comprises adding the 2-alkyl phenol in solution in an inert organic solvent, particularly a hydrocarbon or a halogenated hydrocarbon solvent, to agitated aqueous nitric acid containing at least two equivalents of nitric acid; on completion of the addition raising the temperature of the reaction mixture to further the nitration; cooling the reaction mixture when the reaction is essentially complete and recovering the nitrated phenol.

Alkyl phenols analogous to those used to prepare the carbonates of the present invention have been prepared by reacting phenol with an alkylating agent, e.g. an alkene or a mixture of an alkanol and a dehydrating agent. Using this process the alkylated product is a mixture of 2- and 4-alkyl phenols and further, a mixture of alkyl side chain isomers. To obtain substantially pure 2-alkyl phenol having the desired side chain structure it is necessary to fractionate the mixture e.g. by distillation before or after nitration.

One method of preparing the 2-alkyl phenols involves reacting an o-hydroxybenzoketone with an appropriate alkylmagnesium halide, to yield a tertiary carbinol, dehydration of the carbinol, followed by catalytic hydrogenation of the resultant olefin e.g. using palladium/charcoal in ethanol. Dehydration may occur spontaneously during heating or may be effected by the use of an acid catalyst e.g. potassium hydrogen sulphate, p-toluene sulphonic acid or sulphuric acid. Such a procedure ensures that the 4-alkyl group is branched in the precise manner desired. In some cases it may be advantageous to use the methyl ether of the benzoketone to improve solubility in the reaction solvent and/or to avoid side reactions, demethylation being carried out after reduction of the olefin.

The compounds according to the invention may be formulated for use in any desired way. Generally, such formulations will include at least one such compound in association with a suitable carrier or diluent. If desired, there may be used in addition to such compound(s) one or more further pesticides e.g. other fungicides, acaricides or insecticides. Such carriers may be liquid or solid and designed to aid the application of the compound either by way of dispersing it where it is to be applied or to provide a formulation which can be made by the user into a dispersible preparation.

Liquid preparations thus include preparations of the compound in the form of solutions or emulsions which can be used on their own or be adapted to be made up with water or other diluents to form sprays etc.; in such cases the carrier is a solvent or emulsion base which is non-phytotoxic under the conditions of use. Generally, such preparations will include a wetting, dispersing or emulsifying agent. Other liquid preparations include aerosols in which the compound is associated with a liquid carrier or propellant.

Solid preparations include dusts and wettable powders, granulates and pellets, and semi-solid preparations such as pastes. Such preparations may include inert solid or liquid diluents such as clays, which may themselves have wetting properties, and/or wetting, dispersing or emulsifying agents; binding and/or adhesive agents may also be included. Solid preparations also include thermal fumigating compositions wherein the compound is associated with a solid pyrotechnic component.

In order that the invention may be well understood the following examples are given by way of illustration only:

Preparation of alkyl phenols

The alkyl phenols were prepared using the general method described in our copending application No. 476,707 (Carbonates 2/3 filed on even date herewith) except that the ortho-alkyl compounds were prepared in place of the paraisomers.

2-(1-ethyl-n-hexyl) phenol

This compound was prepared as described and the product had B.P.: 145° C. at 11 mm. Refractive index $n_D^{20}$: 1.5057.

On analysis the compound gave C, 81.03% and H, 10.56% ($C_{14}H_{22}O$ requires C, 81.55% and H, 10.70%).

2-(1-n-propyl-n-pentyl) phenol

This compound was prepared as described and the product had B.P.: 152–153° C. at 16 mm. Refractive index $n_D^{20}$: 1.5070.

Preparation of dinitroalkylphenols

Preparation of 2 - (1 - ethyl - n - hexyl)-4,6-dinitrophenol.—To 2-(1-ethyl-n-hexyl) phenol (7.7 g.) in ethylene dichloride (13.6 ml.) a mixture of concentrated nitric acid (69–72% $HNO_3$; 9 ml.) and water (9 ml.) was added. The mixture was heated under reflux for 1½ hr. The ethylene dichloride layer was separated off, washed with saturated aqueous sodium sulphate solution, dried over anhydrous sodium sulphate and filtered. The ethylene dichloride was removed from the dried solution. The residue was dissolved in light petroleum (50 ml.). Cyclohexylamine (3.5 g.) was added and the mixture refrigerated. The orange coloured crystals that separated were filtered off (9.85 g.), M.P. 134–135° (from toluene). The cyclohexylamine salt of the phenol (9.4 g.) was dissolved in methanol (25 ml.) and the solution acidified with concentrated hydrochloric acid. The mixture was diluted with water and the brown oil that precipitated was extracted with light petroleum, B.P. 60–80° C. The petroleum extract was washed with water, dried over anhydrous sodium sulphate, filtered, the petroleum was removed from the filtrate. 2-(1-ethyl-n-hexyl)-4,6-dinitrophenol was obtained as an oil that soon solidified to a low melting solid (6.4 g.). (Found: N, 9.41; $C_{14}H_{20}N_2O_5$ requires N, 9.46%.)

In a similar manner, 2-(1-n-propyl-n-pentyl)-4,6-dinitrophenol was prepared via its cyclohexylamine salt. The cyclohexylamine salt had M.P. 122–124° C. The dinitrophenol was a red oil having a refractive index $n_D^{20}$ of 1.5540 and solidifying on standing to a solid having a melting point of 33–34° C. On analysis the dinitrophenol gave C, 56.72%, H, 6.68% and N, 9.19% ($C_{14}H_{20}N_2O_5$ requires C, 56.75, H, 6.76 and N, 9.46).

Preparation of carbonates

The carbonates were all prepared from the corresponding 2-alkyl-4,6-dinitrophenols. The physical characteristics of the carbonates of the examples are given in Table 1. In each instance the substances were oils ranging in colour from golden to red-brown. A typical preparation of a carbonate ester is the following for the compound of Example 2. 2 - (1 - ethyl - n - hexyl)-4,6-dinitrophenol (2.07 g.), potassium carbonate (0.48 g.) and acetone (10 ml.) were heated under reflux for 30 mins. Ethyl chloroformate (0.84 g.) was added to the resulting solution and the mixture heated under reflux for 2 hr. 45 min. A precipitate of potassium chloride was filtered off. The acetone was removed from the filtrate and the residue was dissolved in benzene and shaken with aqueous 2 N sodium carbonate. The benzene solution was washed with water and dried over anhydrous sodium sulphate. The dried solution was filtered off and the bnezene removed from the filtrate under reduced pressure to leave 2-(1-ethyl-n-hexyl)-4,6-dinitrophenyl ethyl carbonate, a yellow oil (1.85 g.).

TABLE 1

| Ex. No. | Name of compound | Refractive index $n_D^{20}$ | Analyses Found, percent N | Analyses Required, percent N |
|---|---|---|---|---|
| 1 | Methyl 2-(ethyl-n-hexyl)-4,6-dinitrophenyl carbonate. | 1.5170 | 7.82 | 7.91 |
| 2 | Ethyl 2-(ethyl-n-hexyl)-4,6-dinitrophenyl carbonate. | 1.5133 | 7.62 | 7.61 |
| 3 | n-Propyl 2-(1-ethyl-n-hexyl)-4,6-dinitrophenyl carbonate. | 1.5100 | 7.2 | 7.33 |
| 4 | Isopropyl 2-(1-ethyl-n-hexyl)-,4,6-dinitrophenyl carbonate. | 1.5088 | 6.75 | 7.33 |
| 5 | n-Hexyl 2-(1-ethyl-n-hexyl)-4,6-dinitrophenyl carbonate. | 1.5041 | 6.86 | 6.60 |
| 6 | Methyl 2-(1-n-propyl-n-pentyl)-4,6-dinitrophenyl carbonate. | 1.5187 | 8.19 | 7.91 |
| 7 | Ethyl 2-(1-n-propyl-n-pentyl)-4,6-dinitrophenyl carbonate. | 1.5140 | 7.55 | 7.61 |

As stated above the carbonates of the invention display mildewicidal activity. The results obtained in tests and the methods of testing are shown below.

The products were in all cases formulated using 25 g. of the active compound, 4 g. of calcium dodecyl benzene sulphonate, 4 g. of ethoxylated nonyl phenol and heavy naphtha to give 100 ml.

Acaricidal activity

Each treatment involved two dwarf bean plants, the leaflets of the first triad being 5–8 cm. long. A ring of banding grease was placed round the stem below the triad to prevent the mites moving off the leaves. *Tetranychus telarius* mites resistant to organophosphorus compounds were allowed to transfer from pieces of leaf infested with about 50 adult females on to each leaflet of the triad. Each triad was examined to ensure that it bore approximately 150 adults. The plants were then dipped in the suspension of the test compound for one second, fitted with a filter paper collar at pot level and allowed to dry. Each pot was then placed in a tray filled with water and kept at 75° F. and 60% relative humidity. The assessments were then carried out after 48 hrs. and the percentage kills were calculated with correction for natural mortality.

Cucumber mildew eradicant test

Young cucumber plants with two leaves were kept in a cool greenhouse and allowed to become infected with cucumber mildew originating from infected cucumber plants kept in the same house.

Before application of the toxicant dilution, the amount of mildew present on each plant was assessed by grading each leaf according to the percentage of the leaf area covered by apparently active mildew infection, the scale used being as follows:

| Grade | Percent of leaf area infected by mildew |
|---|---|
| 0 | No mildew present |
| 1 | 0.5 |
| 2 | 1 |
| 3 | 2 |
| 4 | 4 |
| 5 | 8 |
| 6 | 16 |
| 7 | 32 |
| 8 | >64 |

After assessment, the plants were divided up into four groups, to be considered as blocks in the experimental design, each group being as homogeneous as possible in respect of mildew infection of the plants. Within the groups a single plant for each treatment was used, making a total of four replicate plants per treatment. Spraying was by high volume hand sprayer, sufficient spray being applied to ensure thorough coverage. The sprays were prepared by diluting the formulation to give 50 p.p.m. of the test compound in the spray. After spraying, the plants were arranged in the cool greenhouse to form four randomised blocks.

Four days later the mildew infection was again assessed, only the area of active mildew was taken into account.

The mean grade per leaf for the four replicates was calculated and these grades were used for the statistical analysis.

Differences between mean grades before treatment were not significantly great at the 5% level, so percentage control was calculated by comparing the mean grades per leaf (of the four replicates combined) for each treatment with the mean grade per leaf for the untreated plants.

The results obtained are given below in Table 2.

TABLE 2

| Compound of Example No. | Contact activity to *Tetranychus telarius* Kill (percent) at p.p.m. | | | | Cucumber mildew eradication at 50 p.p.m. |
|---|---|---|---|---|---|
| | 300 | 100 | 30 | 10 | |
| 1 | 100 | 100 | 100 | 100 | 100 |
| 2 | 100 | 100 | 97 | 77 | 95 |
| 3 | | 98 | 61 | 45 | 82 |
| 4 | | 100 | 87 | 57 | |
| 5 | | 100 | 99 | 26 | |
| 6 | | 100 | 100 | 98 | 100 |
| 7 | | 100 | 100 | 84 | 99.7 |

Under the same conditions of test Karathane (registered trademark) gave only 50–75% eradication of cucumber mildew.

We claim:
1. A compound of the formula:

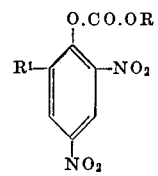

in which R is alkyl of from 1 to 6 carbon atoms, and $R^1$ represents 1-ethyl-*n*-hexyl or 1-*n*-propyl-*n*-pentyl.

2. A compound as claimed in claim 1 in which R represents alkyl containing from 1 to 4 carbon atoms.

3. A compound as claimed in claim 2 in which R represents methyl or ethyl.

4. 2-(1-ethyl-n-hexyl)-4,6-dinitrophenyl methyl carbonate.

5. 2-(1-ethyl-n-hexyl)-4,6-dinitrophenyl ethyl carbonate.

6. 2-(1-n-propyl-n-pentyl)-4,6-dinitrophenyl methyl carbonate.

7. 2-(1-n-propyl-n-pentyl)-4,6-dinitrophenyl ethyl carbonate.

References Cited
UNITED STATES PATENTS

| | | | |
|---|---|---|---|
| 3,123,522 | 3/1964 | Scherer et al. | 167—30 |
| 3,130,037 | 4/1964 | Scherer et al. | 71—2.6 |
| 3,234,260 | 2/1966 | Pianka et al. | 260—463 |

CHARLES B. PARKER, *Primary Examiner.*

L. C. MARUZO, *Assistant Examiner.*